United States Patent
Kang et al.

(10) Patent No.: US 8,797,173 B2
(45) Date of Patent: *Aug. 5, 2014

(54) METHOD AND APPARATUS FOR CHARGE CONTROL OF A PORTABLE TERMINAL HAVING A SOLAR BATTERY

(71) Applicant: Samsung Electronics Co., Ltd., Gyeonggi-do (KR)

(72) Inventors: Jun Chul Kang, Daegu (KR); Seung Chul Choi, Daegu (KR); Jae Ahn Ryu, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,192

(22) Filed: Jun. 17, 2013

(65) Prior Publication Data
US 2013/0278202 A1    Oct. 24, 2013

Related U.S. Application Data

(63) Continuation of application No. 12/788,464, filed on May 27, 2010, now Pat. No. 8,487,778.

(30) Foreign Application Priority Data

May 28, 2009    (KR) .................... 10-2009-0047064

(51) Int. Cl.
*G08B 21/00*    (2006.01)

(52) U.S. Cl.
USPC ............. 340/636.2; 340/636.11; 340/636.18; 340/635; 340/525; 340/664; 320/103; 320/116; 320/118

(58) Field of Classification Search
USPC ............ 340/636.2, 636.11, 636.18, 635, 525, 340/664; 320/103, 116, 118
See application file for complete search history.

(56) References Cited

U.S. PATENT DOCUMENTS

| 7,550,944 B1 | 6/2009 | Rausch |
| 2010/0207571 A1* | 8/2010 | English et al. ................ 320/101 |
| 2010/0301798 A1 | 12/2010 | Chang et al. |

FOREIGN PATENT DOCUMENTS

KR    10-2008-0040500 A    5/2008

* cited by examiner

*Primary Examiner* — Tai T Nguyen
(74) *Attorney, Agent, or Firm* — Cha & Reiter, LLC

(57) ABSTRACT

Provided is an apparatus for controlling charging of a portable terminal equipped with a solar battery that converts solar energy into an electrical energy, the apparatus including a thermistor in which a resistance value changes according to a temperature change; a comparator which outputs a first signal when a temperature surrounding the thermistor is less than a preset reference temperature as determined by the resistance value change of the thermistor according to the temperature change and outputs a second signal when the temperature is at least the preset reference temperature or more; and a charging unit which is activated and receives the electrical energy from the solar battery to charge a battery when the first signal is inputted from the comparator, and is deactivated and blocks the charge of battery in case the second signal is inputted.

31 Claims, 3 Drawing Sheets

METHOD AND APPARATUS FOR CHARGE CONTROL OF A PORTABLE TERMINAL HAVING A SOLAR BATTERY

CLAIM OF PRIORITY

This present application is a Continuation of U.S. patent application Ser. No. 12/788,464 filed on May 27, 2010, now U.S. Pat. No. 8,487,778 which claims the benefit, under 35 U S. C. §119(a), of an application entitled "Method and Apparatus for Charge Control of A Portable Terminal Having A Solar Battery", filed in the Korean Intellectual Property Office on May 28, 2009 and assigned Serial No. 10-2009-0047064, the entire disclosure of which is incorporated by reference, herein.

BACKGROUND OF THE INVENTION

1. Field of the Invention

The present invention relates to the field of portable terminals, and more particularly, to a method and apparatus for charge control of a portable terminal having a solar battery which is capable of charging a battery using solar energy.

2. Description of the Related Art

In general, a method using solar energy is divided into a method using solar heat and a method using photons. The method using solar heat heats water using solar energy to perform heating or power generation. The method using photons converts the photons into electricity to operate various machines and tools. Since the method using solar energy uses unlimited pollution-free solar energy, it has an advantage that electricity can be obtained wherever there is sunshine. Further, the method has an advantage in that atmospheric contamination, noise, heat generation, and vibration does not occur.

With the development of mobile communication technology, portable terminals have become a necessity in today's society as they provide various functions, such as MP3 function, mobile broadcasting receiving function, moving image reproduction function, and camera function in addition to the primary purpose of providing a calling function. According to provisions of the various functions, a time that a user using the portable terminal for other purposes (e.g., listening to music, games and the like) has been rapidly increased.

Accordingly, as the use of portable terminals and they associated functions, increases there is a need for a battery with increased capacity. However, there is a limitation in the increase in a capacity of a battery due to characteristics (e.g., size limitation) of the portable terminal. In recent years, a portable terminal capable of charging the battery using solar energy has been developed. Thus, in the presence of sunlight or solar energy, such a portable terminal can always charge a battery by using solar energy.

However, the battery used for portable terminals has a problem in that the battery can be damaged or the performance of it can be lowered if a charge is continued in a high temperature state. However, a typical portable terminal does not provide a function of stopping the charge of the battery through solar energy in a high temperature state. That is, since the battery charge through solar energy is continued in a high temperature state, the typical portable terminal has a risk that the battery can be damaged.

SUMMARY OF THE INVENTION

The present invention provides a method and apparatus for charge control of a portable terminal having a solar battery which is capable of blocking the charging of the battery when the in-case temperature is over a reference temperature.

In accordance with an aspect of the present invention, an apparatus for controlling a charge of a portable terminal equipped with a solar battery converting a solar energy into an electrical energy includes: a thermistor in which a resistance value changes according to a temperature change; a comparator which outputs a first signal when a temperature less than a preset reference temperature is determined based on a resistance value change of the thermistor and outputs a second signal when the temperature is at least the preset reference temperature; and a charging unit which is activated and receives the electrical energy from the solar battery to charge a battery when the first signal is inputted from the comparator, and is deactivated and blocks the charging of the battery when the second signal is inputted.

In accordance with another aspect of the present invention, an apparatus for controlling a charging of a portable terminal equipped with a solar battery, which converts a solar energy into an electrical energy, includes a thermistor in which a resistance value changes according to a temperature change; a comparator which outputs a first signal when a temperature less than a preset reference temperature is determined base on a resistance value change of the thermistor and outputs a second signal when said temperature at or greater than the preset reference temperature; a controller which generates a blocking signal for blocking a charge function of a battery through the solar battery when the second signal is received from the comparator; and a charging unit which blocks a charging of the battery when the blocking signal is received from the controller.

In accordance with another aspect of the present invention, a method of controlling charging of a portable terminal equipped with a solar battery, which converts a solar energy into an electrical energy, a method comprising: activating a comparator when a temperature is at least a preset reference temperature; deactivating a charging unit which charges a battery by using the solar battery when the comparator is activated.

In accordance with another aspect of the present invention, a circuit for a managing a battery charging function in a portable terminal, the circuit comprising: a first voltage divider circuit comprising a first resistor and a second resistor, receiving a known input voltage level, wherein an output of the first voltage divider circuit represents a reference voltage level; a second voltage divider circuit comprising a third resistor and a temperature-varying resistor, receiving the known input voltage level, wherein an output of the second voltage divider circuit represents a temperature dependent voltage; a comparator having a first port and a second port, the first port receiving the reference voltage level and the second port receiving the temperature-dependent voltage, the comparator generating an output comprising one of a first state and a second state; a charging unit, receiving the output of the comparator, wherein the charging unit allows charging of the battery when the comparator output is in the first state and blocks the charging of the battery when the comparator output is in the second state.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF THE INVENTION

Exemplary embodiments of the present invention are described with reference to the accompanying drawings. Detailed descriptions of well-known functions and structures incorporated herein may be omitted to avoid obscuring the subject matter of the present invention.

It is to be understood that the following disclosure is provided for exemplary purposes only and is not intended as a limitation of the present invention. Furthermore, all alternate embodiments which are obvious modifications of this disclosure are intended to be encompassed within the scope of the present invention.

Before the detailed description of the present invention, for the convenience of illustration, the portable terminal according to an embodiment of the present invention is a terminal capable of charging a battery using solar battery. In this case, the portable terminal is applicable to various information and communication devices and multi-media devices such as Navigation terminals, digital broadcasting terminals, Personal Digital Assistant (PDA), Smart Phone, Portable Multimedia Player (PMP) terminals, International Mobile Telecommunication 2000 (IMT-2000) terminals, Code Division Multiple Access (CDMA) terminals, Wideband Code Division Multiple Access (WCDMA) terminals, Global System for Mobile communication (GSM) terminals, Universal Mobile Telecommunication Service (UMTS) terminals, Notebook computers, Netbook computers, and applications thereof.

Figure 1:
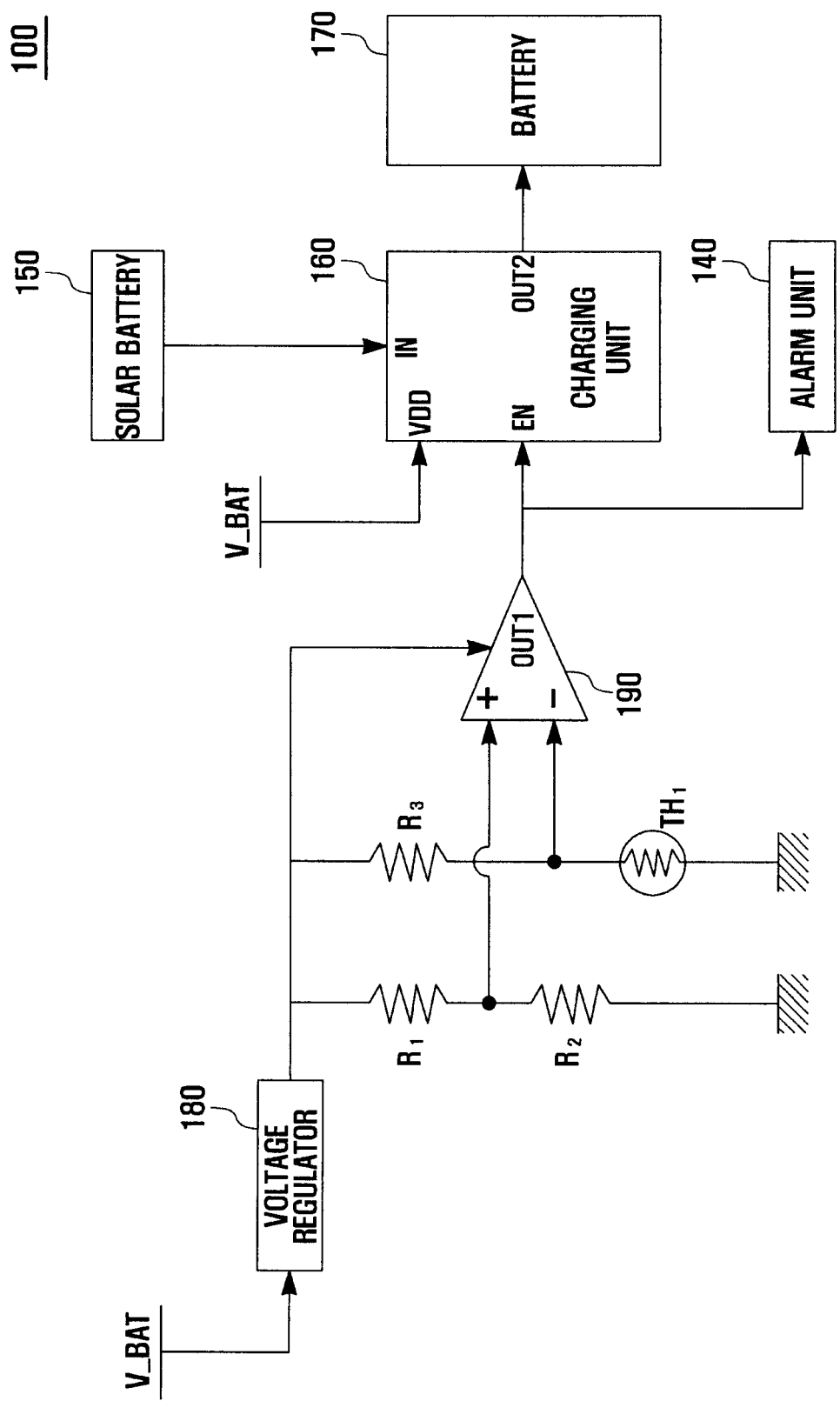
FIG. 1 is a block diagram schematically illustrating a configuration of a portable terminal according to a first embodiment of the present invention.

FIG. 1 is a block diagram schematically illustrating a configuration of a portable terminal according to a first embodiment of the present invention.

Referring to FIG. 1, the portable terminal 100 according to the first embodiment of the present invention can include a voltage regulator 180, a comparator 190, an alarm unit 140, a solar battery 150, a charging unit 160 and a battery 170.

The solar battery 150 can convert solar energy into electrical energy. The solar battery 150 can be classified into a solar battery using solar thermal electricity or a photovoltaic solar battery using photons. Here, the photovoltaic solar battery is simply described as an example of the solar battery. The photovoltaic solar battery is achieved by a P-N junction diode. The photovoltaic solar battery is made based on photovoltaic energy conversion in which electrons are asymmetrically arranged in a semiconductor structure. For example, an n-type zone in the P-N junction diode has large electron density and small hole density, whereas a p-type zone therein has small electron density and large hole density. Accordingly, charge disproportion occurs in a diode formed by a junction between a P-type semiconductor and an N-type semiconductor in a thermal equilibrium state by diffusion due to a density distribution of a carrier. This produces an electrical field, so that the carrier is not diffused any more. When light having energy greater than band gap energy is applied to the P-N junction diode, electrons are excited from a valence band of a material to a conduction band. In this case, the band gap energy refers to an energy difference between the conduction band and the valence band. The electrons excited to the conduction band can freely move, and holes are produced in positions of the valence band from which electrons are discharged. Excessive produced carriers are diffused in the conduction band or the valence band due to a density difference. Flow of existing main carriers present in the P-type semiconductor or the N-type semiconductor is hindered due to an energy barrier occurring by an electrical field during a diffusion procedure, but auxiliary carriers produced due to diffusion can be moved to a different type of a semiconductor. As a result, carriers move during the diffusion procedure to break a charge balance in a natural state. This causes a voltage difference and accordingly electromotive force is produced in both electrodes of the P-N junction diode. The solar battery 150 can be configured as a plurality of solar batteries converting solar energy into electrical energy that are connected to each other in series or in parallel. The solar battery 150 can be formed semi-transparently or opaquely according to its manufacturing method. The solar battery 150 of the present invention is disposed in the body of the portable terminal 100. When the solar battery 150 is disposed in a cover of the portable terminal, it can be semi-transparently or opaquely made. When the solar battery 150 is disposed in the display unit 130 (not shown) of the portable terminal, it can be transparently made. The output current of the solar battery 150 is transferred to the charging unit 160 to be used to charge the battery 170 of the portable terminal 100.

The charging unit 160 is supplied with the electrical energy from the solar battery 150 through an input terminal (IN), and can transmit the electrical energy to the battery 170 through an output terminal (OUT2) to charge the battery 170. At this time, it is preferable that the charging unit 160 is driven by a battery power (V_BAT) so as to charge the battery 170 in the power-off state of the portable terminal 100. That is, it is preferable that a power terminal (VDD) of the charging unit 160 is electrically connected to the power terminal (V_BAT) of the battery 170. This charging unit 160 can include an enable terminal (EN) which activates or deactivates the charge function. The enable terminal (EN) of the charging unit 160 is electrically connected to an output terminal (OUT1) of the comparator 190. That is, the charging unit 160 according to the first embodiment of the present invention can be activated or deactivated according to the output of the comparator 190. For example, in case the comparator 190 outputs a first signal, the charging unit 160 is activated and performs the charge function, whereas in case the comparator 190 outputs a second signal, the charging unit 160 is deactivated and can stop the charge function. Here, in case the charging unit 160 operates in an active low mode, the first signal is a low signal, whereas the second signal is a high signal. At this time, a pull-down resistor (not shown) for preventing a floating state can be connected to the enable terminal (EN) of the charging unit 160.

The battery 170 is a secondary battery for charging and can be made in various forms such as a lithium ion battery, a nickel battery, a cadmium battery, a nickel-cadmium battery, and a chemical battery. The battery 170 can be charged by the charging unit 160 and provides power to respective structural elements of the portable terminal 100. Particularly, the battery 170 can directly supply the power to the voltage regulator 180 and the charging unit 160, so that the voltage regulator 180 and the charging unit 160 can be driven in the off-state of the portable terminal 100.

Even if the input power is changed, the voltage regulator 180 can maintain a constant output voltage. The voltage regulator 180 is disposed between the battery 170 and the comparator 190, and can receive the battery power (V_BAT) and output a preset voltage (e.g., 3V). The output of the voltage regulator 180 can be provided to the drive power of the comparator 190. Moreover, the output of the voltage regulator 180 is distributed by the first resistor (R1) and the second resistor (R2) and is inputted to a non-inverting input terminal (+) of the comparator 190, and is distributed by a third resistor (R3) and a first thermistor (TH1) and is inputted to an inverting input terminal (−) of the comparator 190.

The comparator 190 compares the input voltage of the inverting input terminal (−) with the input voltage of the non-inverting input terminal (+), and can be activated in case the voltage of the non-inverting input terminal (+) is high. In other words, the comparator 190 outputs a high signal in case the input voltage of the non-inverting input terminal (+) is higher than the voltage on the inverted input terminal (−), while outputting a low signal in case the voltage of the inverting input terminal (−) is higher than the voltage on the non-inverted input terminal (+). In the embodiment of the invention shown a given reference voltage is inputted to the non-inverting input terminal (+) and the output of the comparator 190 is controlled according to the change of the input voltage of the inverting input terminal (−). In this case, the comparator 190 can output a first signal for maintaining charge when a temperature less than a preset reference temperature is determined, and output a second signal for stopping charge when a temperature equal to or greater than the preset reference temperature is determined. The change in temperature may be determined in response to a resistance change of the first thermistor (TH1) according to the temperature change. In more detail, the output voltage of the voltage regulator 180 is distributed and inputted to the non-inverting input terminal (+) of the comparator 190 by the first resistor (R1) and the second resistor (R2). At this time, one side of the first resistor (R1) is connected to the voltage regulator 180. One side of the second resistor (R2) can be connected to the other side of the first resistor (R1) and the non-inverting input terminal (+) of the comparator 190, while the other side of the second resistor (R2) can be connected to ground (i.e., a voltage divider circuit). The voltage which is distributed by the first resistor (R1) and the second resistor (R2) and is inputted to the non-inverting input terminal (+) of the comparator 190 is a reference voltage of the comparator 190, and should be set to be lower than a voltage inputted to the inverting input terminal (−) when a temperature less than a preset temperature (hereinafter, room temperature) is determined, and should be set to be higher than the voltage inputted to the inverting input terminal (−) when the temperature is higher than the preset temperature (hereinafter, high temperature). For example, when the voltage regulator 180 outputs a voltage of 3V and a voltage of 1V is inputted to the inverting input terminal (−) of the comparator 190 when a reference temperature (e.g., 40° C.) is present, the ratio of the first resistor (R1) and the second resistor (R2) should be 2:1 so that the reference voltage inputted to the non-inverting input terminal (+) might be 1V. The method for distributing voltage by using the above-described ratio of resistance which is serially connected is well-known and obvious to a person skilled in the art of the present invention and, hence, further detailed description regarding its operation is omitted.

The output voltage of the voltage regulator 180 is also distributed and inputted to the inverting input terminal (−) by the third resistor (R3) and the first thermistor (TH1) which are serially connected. The first thermistor (TH1) is a temperature sensor, and has a characteristic that the resistance value is changed according to temperature. In the present invention, the first thermistor (TH1) can be a negative temperature coefficient (NTC) thermistor in which the resistance value is decreased as the temperature increases. It is preferable that the first thermistor (TH1) is disposed in a place close to the battery 170 so as to accurately measure the temperature change of the battery 170.

In order that the comparator 190 is deactivated at a room temperature and is activated in a high temperature, the voltage which is inputted to the inverting input terminal (−) of the comparator 190 should be higher than the reference voltage (e.g., 1V) in a room temperature condition and should be lower than the reference voltage (e.g., 1V) in a high temperature. To this end, the third resistor (R3) can be set according to the resistance value of the first thermistor (TH1) with respect to the reference voltage and the reference temperature. For example, when the reference voltage inputted to the non-inverting input terminal (+) is 1V and the resistance value of the first thermistor (TH1) is 1 kΩ (kilo-ohm) at the reference temperature, the third resistor (R3) can be set 2 kΩ. Here, one side of the third resistor (R3) is connected to the voltage regulator 180, and one side of the first thermistor (TH1) is connected to the other side of the third resistor (R3) and the inverting input terminal (−) of the comparator 190, while the other side of the thermistor can be connected to ground. Thus, if the temperature exceeds the reference temperature, the resistance value of the first thermistor (TH1) is less than 1 kΩ so that the voltage inputted to the inverting input terminal (−) of the comparator 190 is less than 1V. Thus, the voltage of the non-inverting input terminal (+) of the comparator 190 becomes higher than the input voltage of the inverting input terminal (−) so that the comparator 190 is activated and can output a second signal which blocks further charging. On the other hand, in case the temperature is less than the reference temperature, the resistance value of the first thermistor (TH1) exceeds 1 kΩ so that the input voltage of the inverting input terminal (−) is higher than 1V. Thus, the input voltage of the non-inverting input terminal (+) of the comparator 190 becomes less than the input voltage of the inverting input terminal (−) so that the comparator 190 is deactivated and can output a first signal which maintains charging.

The output terminal (OUT1) of the comparator 190 is connected to the enable terminal (EN) of the charging unit 160 and can control the activation or deactivation of the charging unit 160. That is, in case the charging unit 160 operates in an active low mode, the comparator 190 transmits the first signal (low signal) to the enable terminal (EN) of the charging unit 160 to activate the charging unit 160, while transmitting the second signal (high signal) to the enable terminal (EN) of the charging unit 160 to deactivate the charging unit 160. Accordingly, the portable terminal 100 can prevent the battery 170 from being charged in a high temperature (greater than reference temperature), so that the damage (e.g., explosion) of the battery 170 due to charging in a high temperature state can be prevented.

As would be appreciated and recognized, the reference voltage and the first resistor (R1) to the third resistor (R3) are just an example, and thus, the present invention is not limited to this example. That is, the reference voltage and the first resistor (R1) to the third resistor (R3) can be set according to the intention of the designer in such a manner that the comparator 190 outputs the first signal at room temperature and outputs the second signal when a high temperature (greater than the reference (room) temperature).

Moreover, in case the comparator 190 is operable at an input voltage in the range of 3V to 4.5V in which the portable terminal 100 operates, the voltage regulator 180 can be removed and the comparator 190 use the battery power (V_BAT) directly.

Moreover, it is illustrated that the first thermistor (TH1) is a NTC thermistor in which the resistance value is decreased as the temperature increases. However, the present invention is not limited to this condition. That is, the first thermistor (TH1) can be a PTC wherein the resistance value is increased as the temperature increases. In this case, the location of the first thermistor (TH1) and the third resistor (R3) should be changed.

The alarm unit 140 is an apparatus for providing an indication that the charge of the battery 170 is blocked due to a high temperature. A light emitting diode (LED) can be used for the alarm unit 140. To this end, one side (+ terminal) of the light emitting diode (LED) can be connected to the output terminal (OUT1) of the comparator 190 while the other side (− terminal) can be grounded (not shown). Since the comparator 190 is deactivated in a room temperature condition while being activated in a high temperature, this light emitting diode (LED) is turned on in a high temperature to inform a user that the charge function through the solar battery 150 is blocked.

In the meantime, in the above, it is illustrated that the charging unit 160 is activated when a low signal is inputted to the enable terminal (EN), but the present invention is not limited to this. That is, the charging unit 160 can be activated when a high signal is inputted to the enable terminal (EN). In this case, it is preferable that the enable terminal (EN) includes a pull-up resistor. And it is preferable that the comparator 190 is deactivated to output a low signal when a temperature which is equivalent to or greater than the reference temperature.

Moreover, although not illustrated, the portable terminal 100 selectively includes structural elements having supplementary features such as a camera module for photographing an image or a video, a local area communications module for local area wireless communication, a broadcasting reception module for the reception of broadcasting, a digital sound playing module like a MP3 module, and an internet communications module which communicates with internet network and performs an internet function. The variation of these elements is so various due to the convergence trend of the digital device that it cannot be altogether enumerated, but the portable terminal 100 can further include elements which are equivalent to the above mentioned elements.

Figure 2:
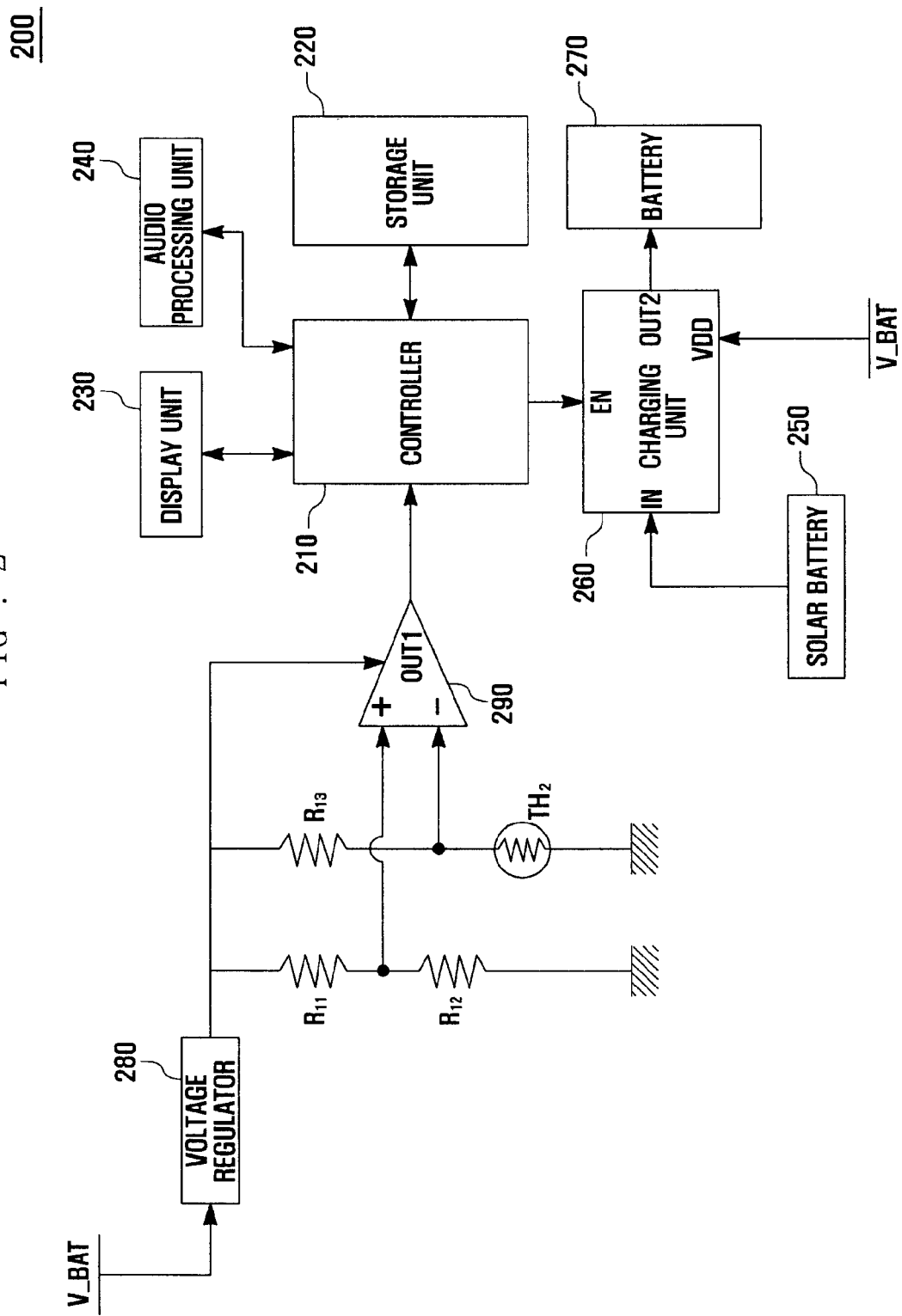
FIG. 2 is a block diagram schematically illustrating a configuration of a portable terminal according to a second embodiment of the present invention.

FIG. 2 is a block diagram schematically illustrating a configuration of a portable terminal 200 according to a second embodiment of the present invention.

Hereinafter, the detailed description about the configuration of performing the same function as FIG. 1 is omitted.

Referring to FIG. 2, the portable terminal 200 according to the second exemplary embodiment of the present invention includes a voltage regulator 280, a comparator 290, a controller 210, a storage unit 220, a display unit 230, an audio processing unit 240, a solar battery 250, a charging unit 260 and a battery 270.

The voltage regulator 280 can receive power (V_BAT) of the battery 270 and output a constant voltage as described with regard to the first exemplary embodiment shown in FIG. 1. The comparator 290 can be activated when a temperature greater than or equal to a reference temperature is detected during the charging of the battery 270 through the solar battery 250. The output of the comparator 290 can be transmitted to the controller 210 differently than that described with regard to the first exemplary embodiment shown in FIG. 1. The charging unit 260 can be deactivated when a high temperature is detected under the control of the controller 210 to stop the charging of the battery 270 differently from that described with regard to the first exemplary embodiment.

The controller 210 can perform the overall control function of the portable terminal 200, and can control a signal flow between respective blocks within the portable terminal 200. Particularly, in case the comparator 290 is activated, the controller 210, according to the second exemplary embodiment of the present invention, can transmit a control signal to the enable terminal (EN) of the charging unit 260 to deactivate the charging unit 260. Moreover, the controller 210 can control to output message and image which informs the user that the charge function of the battery 270 is blocked due to a high temperature state. The controller 210 may provide an output message and/or image to the display unit 230 or transmit an alarm sound through the audio processing unit 240.

In one aspect of the invention, if the portable terminal 200 is in a power-off state when the controller 210 receives a high signal from the comparator 290 because of detecting a high temperature state during the charging of battery 270, the controller 210 can activate only some functions. For example, the controller 210 can activate the function of controlling the activation/deactivation of the charging unit 260 and some functions for controlling the display unit 230 and the audio processing unit 240. Since the method that an interrupt signal is received in a power-off state to activate some functions is obvious to a person skilled in the art of the present invention, the detailed description of such operation is omitted.

As described above, the controller 210 can transmit a control signal (high signal) for deactivating the charging unit 260 to the enable terminal (EN) of the charging unit 260. At this time, the controller 210 can control the output message and/or the image to the display unit 230 that informs the user that the charge through the solar battery 250 is blocked due to a high temperature. Alternatively, the controller 210 can control the output of an alarm sound which also informs the user that a charge through the solar battery 250 is blocked. Then, the controller 210 can return to a power-off state if the output of the comparator 290 is deactivated.

The display unit 230 can output a screen data which is generated when performing the function of the portable terminal 200, and a state information according to key manipulations and function settings of the user. Moreover, the display unit 230 can visually display various signals and color information outputted from the controller 210. The display unit 230 can be composed of a liquid crystal display (LCD) or an organic light-emitting diode (OLED). In case the display unit 230 is implemented by a touch screen mode, the display unit 230 can operate as an input unit (not shown) for receiving an input from user. Particularly, the display unit 230 can output at least one of a message and an image informing the user that the battery 270 is charging through the solar battery 250 under the control of the controller 210. And the display unit 230 can output at least one of a message and an image that informs a user that the battery 270 charge function through the solar battery 250 is blocked due to a high temperature state.

The audio processing unit 240 can convert voice/sound data into an audible sound under the control of the controller 210 and output the converted sound through a speaker (not shown). Moreover, the audio processing unit 240 can receive an audio signal such as a user voice inputted from a microphone (not shown). Particularly, the audio processing unit 240, under the control of the controller 210, can output an alarm sound which informs a user that the charging of the battery 270 is blocked due to a high temperature. Thus, user can recognize that the charging of the portable terminal 200 is not being performed due to a high temperature. The user may then move to another place to continue the charging operation.

The storage unit 220 can store programs necessary to execute an overall operation and specific functions of the portable terminal 200, and data created during execution of the programs. For instance, the storage unit 120 can store an operating system (OS) for starting (i.e., booting) the portable terminal 200, application programs necessary for function operations of the portable terminal 200, and data created according to a use of the portable terminal 200. The storage unit 220 can be configured with at least one of a read only memory (ROM) and a random access memory (RAM). In particular, the storage unit 220 can store a program including a routine for blocking the charge of the battery 270 when signals are received regarding the status of the comparator 290, and a routine for informing a user of the blocking of a battery charge. Moreover, the storage unit 220 can store at least one of a message, an image and an alarm sound which informs a user that the charge of the battery 270 is blocked.

Moreover, although not illustrated, the portable terminal 200 may further include structural elements having supplementary features such as a camera module for photographing an image or a video, a local area communications module for local area wireless communication, a broadcasting reception module for the reception of broadcasting, a digital sound playing module like a MP3 module, and an internet communications module which communicates with the internet network and performs an internet function. The variation of these elements is so various due to the convergence trend of the digital device that it cannot be altogether enumerated, but the portable terminal 200 can further include elements which are equivalent to the above mentioned elements.

Figure 3:
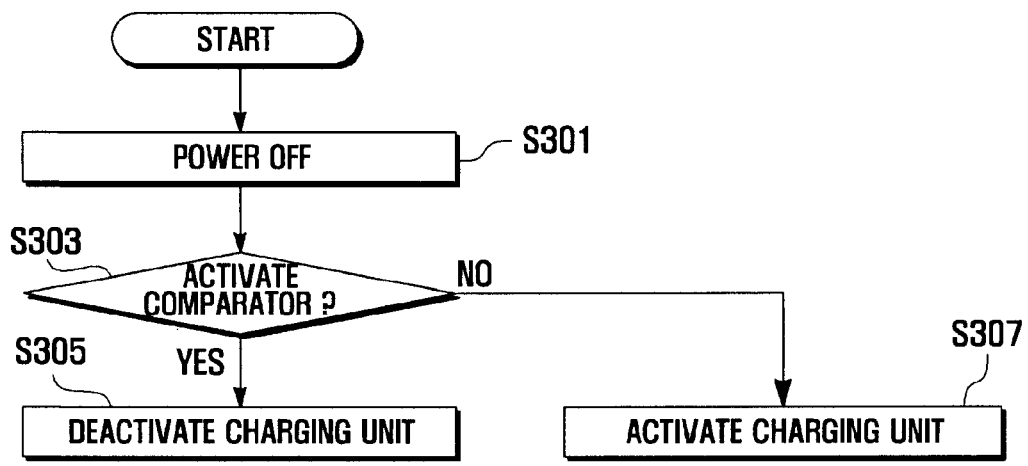
FIG. 3 is a flowchart illustrating a charge control process of a portable terminal according to a first embodiment of the present invention.

FIG. 3 is a flowchart illustrating a charge control process of a portable terminal according to a first embodiment of the present invention.

Hereinafter, the charge control process is illustrated based on a power-off state of the portable terminal 100. And it is assumed that the charging unit 160 operates in an active_low mode. However, the present invention is not limited to this. That is, the charging unit 160 can operate in an active_high mode.

Referring to FIGS. 1 and 3, the portable terminal 100 can be a power-off state (S301). At this time, the voltage regulator 180, the comparator 190, and the charging unit 160 for performing the charge function using the solar battery 150 are activated because the battery power (V_BAT) is used as a driving power. That is, the battery 170 can be charged through the solar battery 150 even when the portable terminal 100 is in a power-off state.

The comparator 190 can be activated or deactivated according to a temperature value (S303). To this end, in the comparator 190, a voltage (hereinafter, reference voltage) distributed by two resistors (R1, R2), which are serially connected, is inputted to the non-inverting input terminal (+), while a voltage distributed by the resistor (R3) and the first thermistor (TH1), which are serially connected, is inputted to the inverting input terminal (−). At this time, the resistance value of the first thermistor (TH1) is changed according to temperature. The first thermistor (TH1) can be a thermistor which has a negative temperature coefficient (NTC) wherein the resistance value is decreased as the temperature is increased. In one aspect, the comparator 190 is deactivated and outputs a first signal when a temperature less than a reference temperature is determined. That is, the input voltage at the inverting input terminal (−) of the comparator 190 becomes greater than the input voltage of the non-inverting input terminal (+) of the comparator 190. Alternatively, the comparator 190 outputs a second signal after being activated when the input voltage of the non-inverting input terminal (+) becomes greater than the input voltage of the inverting input terminal (−) due to the reduction of the resistance value of the first thermistor (TH1). Here, the first signal can be a low signal and the second signal can be a high signal.

The charging unit 160 can be activated when the comparator 190 is deactivated (S307). That is, when a temperature is at a room temperature (i.e., a preset temperature), the charge function can be maintained because there is no danger of damaging the battery 170. On the other hand, in order to prevent the battery 170 from damage caused by the charging of battery 170 at a higher temperature, the charging unit 160 can be deactivated when the comparator 190 is activated (S305).

The portable terminal 100 can further perform an alarm process for informing a user or providing an indication that the charge function of the portable terminal 100 is blocked due to a high temperature. To this end, the portable terminal 100 can include an alarm unit 140. In case the alarm unit 140 is configured with a light emitting diode (LED), one side (+ terminal) of the light emitting diode (LED) may be connected to an output terminal of the comparator 190, while the other side (− terminal) can be grounded (not shown). Accordingly, a user can know that the charge function using the solar battery 150 is blocked due to a high temperature state when the light emitting diode (LED) is lighted.

Figure 4:
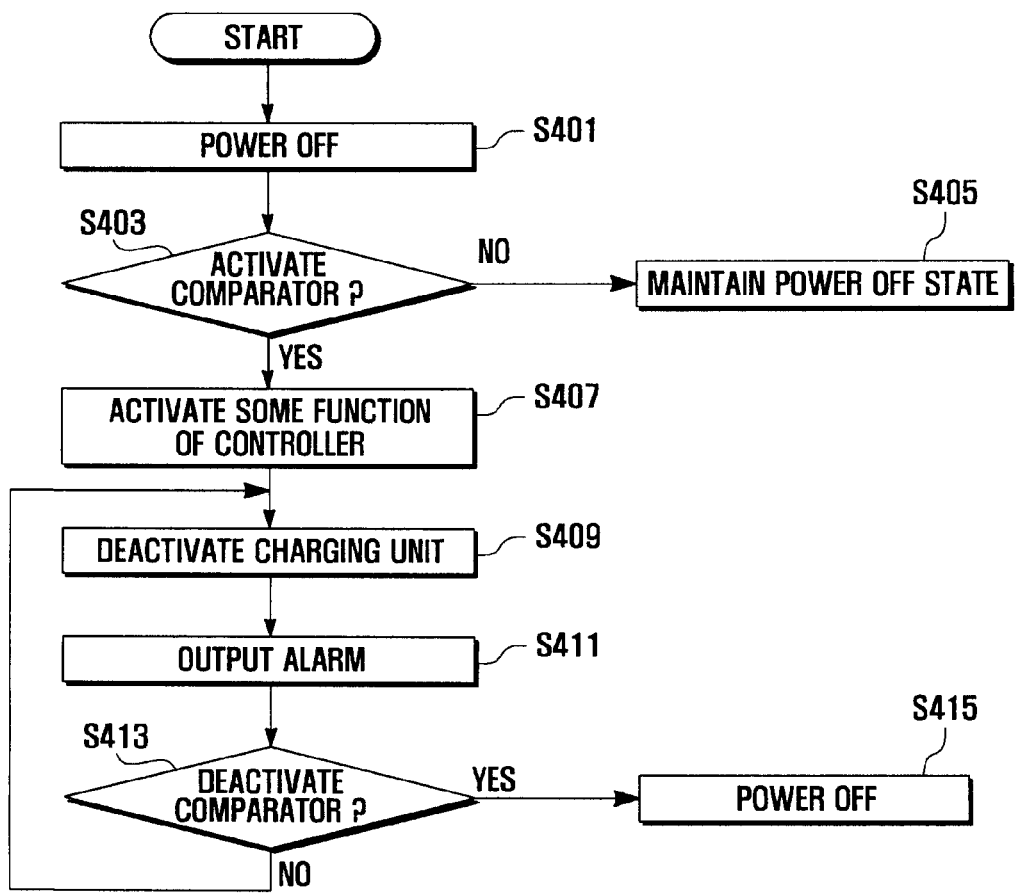
FIG. 4 is a flowchart illustrating a charge control process of a portable terminal according to a second embodiment of the present invention.

FIG. 4 is a flowchart illustrating a charge control process of a portable terminal according to a second embodiment of the present invention.

The charge control process is illustrated based on a power-off state of the portable terminal 200. And it is assumed that the charging unit 260 operates in an active_low mode. However, the present invention is not limited to this. That is, the charging unit 260 can operate in an active_high mode and it would well-known to those skilled in the art to alter the circuit shown herein, without undue experimentation, to achieve an active_high mode of operation. According, such alternation is considered to be within the scope of the invention claimed.

Referring to FIG. 2 and FIG. 4, the portable terminal 200 can be a power-off state (S401). At this time, the voltage regulator 280, the comparator 290, and the charging unit 260 for performing the charge function using the solar battery 250 are activated because the battery power (V_BAT) is used as a driving power. That is, the battery 270 can be charged through the solar battery 250 even when the portable terminal 200 is a power-off state. At this time, the enable terminal (EN) of the charging unit 260 can include a pull-down resistor to prevent a floating state. Accordingly, the charging unit 260 can be an active state as a default.

The comparator 290 can be activated or deactivated according to a determined temperature (S403). To this end, in the comparator 290, a reference voltage distributed by two resistors (R1, R2) which are serially connected is inputted to the non-inverting input terminal (+), while a voltage distributed by one resistor (R3) and the second thermistor (TH2) which are serially connected is inputted to the inverting input terminal (−). At this time, the resistance value of the second thermistor (TH2) is changed according to a change in temperature. The second thermistor (TH2) can be a thermistor which has a negative temperature coefficient (NTC) wherein the resistance value is decreased as the temperature is increased. The comparator 290 outputs a first signal as the input voltage of the inverting input terminal (−) becomes greater than the input voltage of the non-inverting input terminal (+) (i.e., a temperature surrounding the thermistor is less than a reference temperature). In addition, the comparator 290 outputs a second signal as the input voltage of the non-inverting input terminal (+) becomes greater than the input voltage of the inverting input terminal (−) due to the reduction of the resistance value of the second thermistor (TH2) (i.e., the temperature surrounding the thermistor exceeds the reference temperature). Here, the first signal can be a low signal and the second signal can be a high signal. However, a previously discussed, the first signal may be a high signal and the second signal may be a low signal and the alternations to achieve this configuration are well-known in the art.

The portable terminal 200 can maintain the power off state in case the comparator 290 is deactivated (S405). As described above, the charging unit 260 is in an activation state. Thus, charging of the battery 270 is possible in this power-off state. On the other hand, some functions of the controller 210 can be activated in case the comparator 290 is activated (S407). That is, among the functions of the controller 210, only some functions for controlling the activation of the charging unit 260 according to the output signal of the comparator 290 and informing the blocking of charge, i.e., the deactivation of the charging unit 260 can be activated.

In this case, the controller 210 can deactivate the charging unit 260 (S409). To this end, the controller 210 can transmit a control signal (e.g., high signal) for blocking the charge function to the enable terminal (EN) of the charging unit 260.

Then, the controller 210 can also output an alarm for informing a user (or another device) that the charging of the battery 270 is blocked due to a high temperature state (S411). The alarm can include at least one of a message and an image outputted to display unit 230, and an alarm sound transmitted through an audio processing unit 240.

The controller 210 can check whether the comparator 290 is deactivated (S413). In case the comparator 290 is deactivated, the controller 210 can deactivate some activated functions and turn the portable terminal 200 off (S415). On the other hand, in case the comparator 290 is in the active state, the controller 210 can return to step 409 and maintain the state of blocking the charge function of the battery 270 until the comparator 290 is deactivated. That is, the controller 210 can deactivate the charging unit 260 until a temperature surrounding the thermistor (which is preferably near the battery 270) is less than the reference temperature so that there is no danger of damaging the battery 270.

As described above, in the present invention, the comparator is activated when a temperature is at least at a reference temperature or more by using a thermistor in which the resistance value changes according to temperature, and the charge function through the solar battery is blocked in the activation of the comparator.

In the meantime, in the above, it was illustrated that a control signal is transmitted to an enable terminal of a charging unit to block the charge function of battery, but the present invention is not limited to this. For example, in the present invention, a switch may be mounted in a path between the output terminal of the charging unit and the battery, and the switch is deactivated when a temperature is at least a reference temperature or more, so that the charge function of battery can be blocked. Alternatively, in the present invention, a switch may be mounted in a path between the charging unit and the solar battery and the electrical energy of the solar battery is not sent to the charging unit when a temperature is at least a reference temperature or more, so that the charge function of battery can be blocked.

Moreover, in the above, it was illustrated that the charging of battery 270 is blocked in a high temperature state which is represented as being at least a preset reference temperature or more, but the present invention is not limited to this. For example, the present invention can block the charge function of the battery in a low temperature. To this end, the present invention can include a first comparator sensing a high temperature state and a second comparator sensing a low temperature state. Thus, in this aspect of the invention, charging of the battery occurs when the temperature is within a desired or designated temperature range.

As described above, according to a charge control device and method of a portable terminal equipped with a solar battery suggested in the present invention, the charging of the battery through the solar battery can be blocked when a temperature is determined to be at least a reference temperature or more so that the damage of battery 270 can be prevented. Accordingly, the safety of user can be improved. Moreover, the present invention can block the charging of the battery 270 through the solar battery when a temperature is determined to be at least a reference temperature or more even in case of the power off state of the portable terminal.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for controlling charging of a portable terminal having a solar battery, the apparatus comprising:
a temperature sensing unit for measuring a temperature change;
a comparator for outputting a first signal when a temperature is less than a preset reference temperature and outputting a second signal when the temperature is equal to or greater than the preset reference temperature; and
a charging unit for charging a battery with current from the solar battery, wherein the charging unit is activated when the first signal is received from the comparator, and is deactivated when the second signal is received from the comparator.

2. The apparatus of claim 1, further comprising: a voltage regulator for receiving a battery power from the battery and outputting a constant voltage, wherein the voltage regulator is disposed between the comparator and a power terminal of the battery.

3. The apparatus of claim 1, wherein the temperature is determined by the temperature sensing unit including a thermistor in which a resistance value changes according to the temperature change.

4. The apparatus of claim 1, wherein the first signal is a low signal, and the second signal is a high signal.

5. The apparatus of claim 4, further comprising: a pull-down resistor which is connected between an output terminal of the comparator and an enable terminal for controlling an activation of the charging unit, the pull-down resistor preventing a floating state of the charging unit.

6. The apparatus of claim 4, further comprising:
a first resistor which is connected to the voltage regulator at a first side;
a second resistor having a first side and a second side, the first side of the second resistor being connected to a second side of the first resistor and a non-inverting input terminal of the comparator and the second side of the second resistor being connected to a ground point; and
a third resistor which is connected to the voltage regulator at a first side,
wherein the thermistor includes a first side and a second side, the first side of the thermistor being connected to a second side of the third resistor and an inverting input terminal of the comparator e and the second side of the thermistor being connected to ground point.

7. The apparatus of claim 6, wherein the thermistor is a thermistor having a negative temperature coefficient (NTC) characteristic wherein a resistance value is decreased as temperature increases.

8. The apparatus of claim 1, further comprising: an alarm unit which provides an alarm indication that the charging of the battery is blocked.

9. The apparatus of claim 8, wherein the alarm unit is a light emitting diode, and the light emitting diode is connected to an output terminal of the comparator at one side and is grounded at another side.

10. An apparatus for controlling charging of a portable terminal having a solar battery, the apparatus comprising:
a temperature sensing unit for measuring a temperature change;
a comparator for outputting a first signal when a temperature is less than a preset reference temperature and outputting a second signal when the temperature is equal to or greater than the preset reference temperature;
a controller for outputting, when the second signal is received from the comparator, a blocking signal for blocking a battery charging function provided by the solar battery; and
a charging unit for blocking the battery charging function in response to the blocking signal from the controller.

11. The apparatus of claim 10, further comprising: a voltage regulator for receiving a battery power from the battery and outputting a constant voltage, wherein the voltage regulator is disposed between the comparator and a power terminal of the battery.

12. The apparatus of claim 10, wherein the temperature is determined by the temperature sensing unit including a thermistor in which a resistance value changes according to the temperature change.

13. The apparatus of claim 10, further comprising at least one of:
an audio processing unit which generates an alarm sound which provides information that the charging of the battery is blocked under the control of the controller; and
a display unit which outputs at least one of a message and an image which provides information that the charging of the battery is blocked under the control of the controller.

14. A method for controlling charging of a portable terminal having a solar battery, the method comprising:
activating a comparator when a temperature is equal to or greater than a preset reference temperature, wherein the comparator is operated by a voltage regulator outputting a constant voltage; and
deactivating a charging unit that charges a battery by using electrical power provided by the solar battery when the comparator is activated.

15. The apparatus of claim 14, wherein the temperature is determined by the temperature sensing unit including a thermistor in which a resistance value changes according to the temperature change.

16. The method of claim 14, wherein the comparator is activated in response to a resistance value change of a thermistor in which the resistance value changes according to the temperature change.

17. The method of claim 14, wherein deactivating a charging unit comprises: inputting an output signal according to the activation of the comparator to an enable terminal controlling the activation of the charging unit.

18. The method of claim 14, wherein deactivating a charging unit comprises:
transmitting an output signal according to the activation of the comparator to a controller;
activating the controller which has received the signal from the comparator;
transmitting a control signal, by the controller, for blocking a charging function to an enable terminal of the charging unit.

19. The method of claim 14, further comprising:
outputting an alarm indication which provides information that the charging of the battery function is blocked.

20. The method of claim 19, wherein outputting an alarm comprises at least one of:
outputting a preset alarm sound through an audio processing unit;
outputting at least one of preset message and an image to a display unit: and
lighting a light emitting diode.

21. A circuit for a managing a battery charging function in a portable terminal, the circuit comprising:
a first voltage divider circuit comprising a first resistor and a second resistor, receiving a known input voltage level, wherein an output of the first voltage divider circuit represents a reference voltage level;
a second voltage divider circuit comprising a third resistor and a temperature-varying resistor, receiving the known input voltage level, wherein an output of the second voltage divider circuit represents a temperature dependent voltage;
a comparator having a first port and a second port, the first port receiving the reference voltage level and the second port receiving the temperature-dependent voltage, the comparator generating an output comprising one of a first state and a second state; and
a charging unit, receiving the output of the comparator, wherein the charging unit allows charging of the battery when the comparator output is in the first state and blocks the charging of the battery when the comparator output is in the second state.

22. The circuit of claim 21, wherein the ratio of the first resistor and the second resistor of the first voltage divider circuit set the reference voltage level to be comparable to a preset temperature.

23. The circuit of claim 21, wherein the temperature varying resistor is a temperature sensing unit.

24. The apparatus of claim 23, wherein the temperature sensing unit includes a thermistor selected from the group consisting of: a negative temperature coefficient thermistor and a positive temperature coefficient.

25. The circuit of claim 21, further comprising:
a solar battery connected to the charging unit, the solar battery converting solar energy to electrical energy.

26. The circuit of claim 21, further comprising:
an alarm unit comprising at least one of an audio unit and a display unit.

27. The circuit of claim 26, further comprising:
generating at least one of an audio output and a visual output.

28. The circuit of claim 21, further comprising:
a voltage regulator for providing the input voltage to the first and second divider circuits.

29. The circuit of claim 28, wherein an output of the battery is provided to the voltage regulator.

30. The circuit of claim 21, wherein the first state occurs when the temperature dependent voltage is greater than the reference voltage.

31. The circuit of claim 21, wherein the first state occurs when the temperature dependent voltage is less than the reference voltage.

* * * * *

UNITED STATES PATENT AND TRADEMARK OFFICE
CERTIFICATE OF CORRECTION

PATENT NO.         : 8,797,173 B2
APPLICATION NO.    : 13/919192
DATED              : August 5, 2014
INVENTOR(S)        : Jun Chul Kang et al.

It is certified that error appears in the above-identified patent and that said Letters Patent is hereby corrected as shown below:

In the Claims

Column 13, Claim 6, Line 19 should read as follows:
--...the comparator and the...--

Column 14, Claim 20, Lines 36-37 should read as follows:
--...a display unit; and...--

Column 14, Claim 21, Line 39 should read as follows:
--...A circuit for managing...--

Signed and Sealed this
Twenty-first Day of October, 2014

Michelle K. Lee
*Deputy Director of the United States Patent and Trademark Office*